United States Patent [19]
Jones, Jr. et al.

[11] Patent Number: 5,637,420
[45] Date of Patent: Jun. 10, 1997

[54] SELF-LATCHING HANDLE FOR STORAGE BATTERIES

[75] Inventors: Henry A. Jones, Jr., Milwaukee; Walter S. Maxel, Brookfield, both of Wis.; David J. Novak, Pickney; Stephen J. Kepler, South Lyon, both of Mich.; Paul D. Korinek, West Bend, Wis.

[73] Assignee: Globe-Union Inc., Milwaukee, Wis.

[21] Appl. No.: 522,770

[22] Filed: Sep. 1, 1995

[51] Int. Cl.$^6$ .............................. H01M 2/10; A45F 5/00
[52] U.S. Cl. .................. 429/187; 294/169; 294/903; 16/DIG. 15; 220/762; 220/763; 220/764
[58] Field of Search ........................ 429/187, 175, 429/176; 224/902, 929; 206/676, 703; 294/158, 169, 903; 16/DIG. 15, 114 R; 220/759, 761, 762, 763, 764, 768, 770, 773

[56] References Cited

U.S. PATENT DOCUMENTS

| | | | |
|---|---|---|---|
| 4,029,248 | 6/1977 | Lee | 16/114 R |
| 4,673,625 | 6/1987 | McCartney | 429/187 |
| 4,727,620 | 3/1988 | Gummelt | 16/115 |
| 4,799,306 | 1/1989 | Collins et al. | 29/453 |
| 4,861,687 | 8/1989 | Brantly et al. | 429/187 |
| 5,144,719 | 9/1992 | Arthur | 16/114 R |
| 5,232,796 | 8/1993 | Baumgartner | 429/187 |
| 5,461,755 | 10/1995 | Hardigg et al. | 16/112 |

FOREIGN PATENT DOCUMENTS

| | | | |
|---|---|---|---|
| 627030 | 3/1936 | Germany | 429/187 |
| 8200147 | 6/1982 | Netherlands | 220/762 |
| 320622 | 3/1957 | Switzerland | 220/762 |
| 2047948 | 12/1980 | United Kingdom | 429/187 |
| 2095214 | 9/1982 | United Kingdom | 220/762 |
| 2145994 | 4/1985 | United Kingdom | 220/768 |
| 2244972 | 12/1991 | United Kingdom | 220/770 |

*Primary Examiner*—Kathryn L. Gorgos
*Assistant Examiner*—Alex Noguerda
*Attorney, Agent, or Firm*—Harness, Dickey & Pierce, P.L.C.

[57] ABSTRACT

A self-latching handle for storage batteries includes a cam mechanism formed integrally with the ends of the battery handle, the cam mechanism cooperating with the battery housing as the battery handle is rotated downwardly from a vertical attachment position to a horizontal storage position to lift the ends of the battery handle to move pivot post portions of the battery handle into pivot apertures formed in the cover of the battery housing and to lock the battery handle to the battery housing while permitting the battery handle to be pivoted between the horizontal storage position and a vertical use position without becoming detached from the battery housing.

19 Claims, 4 Drawing Sheets

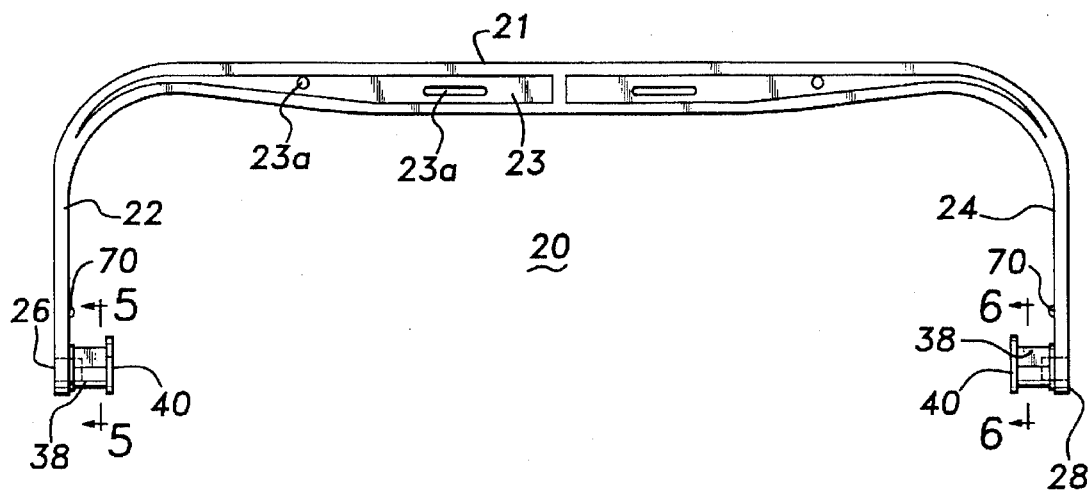
Fig-3
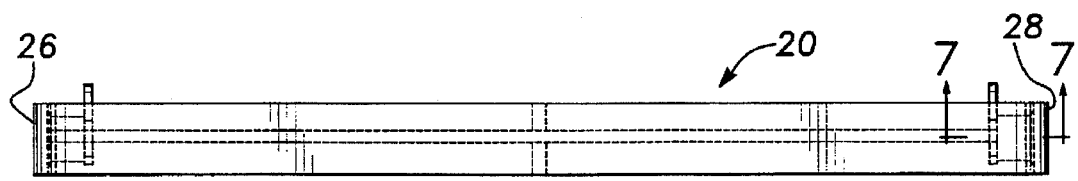
Fig-4
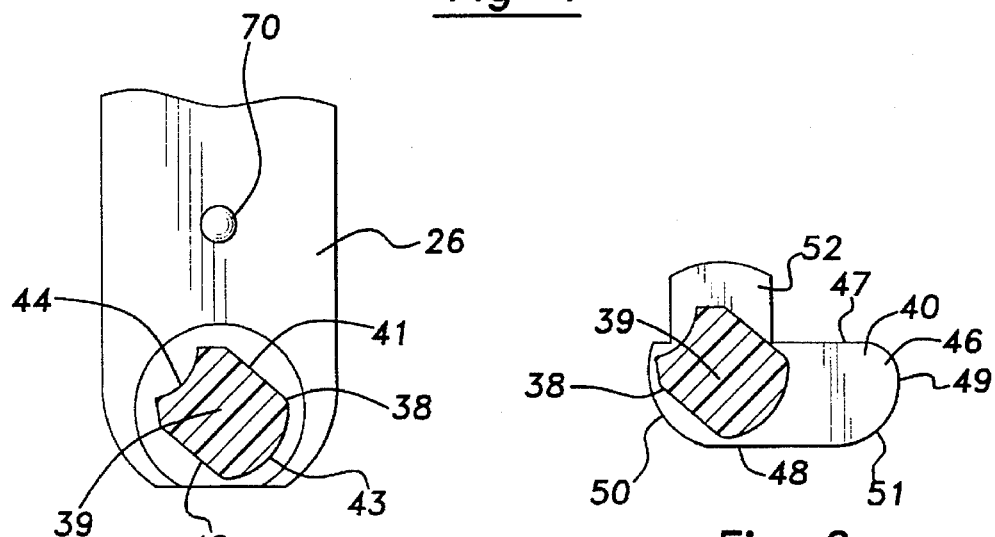
Fig-5
Fig-6

SELF-LATCHING HANDLE FOR STORAGE BATTERIES

BACKGROUND OF THE INVENTION

1. Field of the Invention

This invention relates to storage batteries, and more particularly, to a self-latching handle for storage batteries.

2. Description of the Prior Art

Storage batteries are typically heavy and bulky items which makes handling of the batteries difficult both during manufacture and assembly of the batteries and in end user situations. Handles are used to facilitate moving the battery during assembly on an assembly line. In addition, handles are used in end user situations to make it easier to handle the battery. Typically, battery handles are in the form of a strap formed from a simple band of plastic and having a hole at each end that is received on mounting posts that are formed on the battery housing. Generally, such mounting posts are formed integrally with the cover that is applied to the container.

One example of a strap-type battery handle is disclosed in U.S. Pat. No. 4,029,248. This battery handle has a non-circular aperture at each end which is adapted for mounting on mounting posts formed on opposite sides of the battery case. The mounting posts have non-circular ends. To attach the handle to a battery, the handle is oriented horizontally aligning the non-circular aperture of the handles with the non-circular ends of the mounting posts, allowing the ends of the mounting posts to pass through the apertures in the ends of the handles. The handle then is rotated up to a vertical position, moving the apertures in the handle out of alignment with the posts. An important disadvantage of this arrangement is that the mounting posts project outwardly from the sides of the cover and thus are susceptible to damage. If one of the posts is broken off inadvertently, a handle cannot be installed on the battery.

In other arrangements, more sophisticated handle assemblies are employed to prevent the handles from releasing from the container. One example of such handle is disclosed in U.S. Pat. No. 5,232,796. In this arrangement, the handle includes an entry aperture, an upright aperture and a service aperture. To attach the handle to the battery, pivot posts on the ends of handles are pushed into the entry aperture. Then, the ends of the handle are moved sideways and the handle is jerked upwards to move the pivot posts into the upright aperture. The handle can be moved with force from the upright position to a service position, but this requires applying a force to the handle to rotate the handle past constrictions. This handle arrangement requires that the user apply a force to the handle to move the handle from the entry position to the upright position. Likewise, a force is required to move from the handle from the upright position to the service position. Such constraints are undesirable in manufacturing because of the risk of possible injury to laborers assembling the handle on the battery. Another disadvantage of this handle arrangement, is that during assembly, the handle must be positioned to have a particular orientation relative to the battery casing and such requirement results in a slow down in production as the assembler orients the handle in the required position. Moreover, moving the handle from the use position to the service or storage position requires rotating the handle towards the battery terminals, and the handle is located proximal to the battery terminals when it is in the storage position. In addition, a locking tab must be provided to prevent the handle from moving back into the entry position which would permit the handle to release from the cover, a potentially hazardous condition.

SUMMARY OF THE INVENTION

The present invention provides a self-latching handle for a storage battery. The handle includes an elongated handle member having first and second arms and a gripping portion interconnecting the first and second arms. Each of the arms defines an end portion including a pivot member and cam means that are located proximal to each end of the handle member. The battery housing includes receptor means on opposing sides thereof including a pivot aperture for receiving the pivot member and an installation opening for receiving the cam means.

The handle member is adapted to be installed on the battery housing in an installation position in which the handle member is oriented generally vertically with the cam means located in the installation opening and aligned with bearing surfaces of the installation openings, and with the pivot members located outside of the pivot apertures. Preferably, the handle member is pivoted to the cover of the battery. The handle member is movable from the installation position to a storage position in which it lies in a substantially horizontal plane and the pivot members are repositioned to be located in the pivot apertures. To this end, the cam means is constructed and arranged to move along the bearing surface of the receptor means, pivoting the handle member about the cam means as the handle member is moved from the installation position to the storage position, to thereby move the pivot members into the pivot apertures. When the pivot members are located in the pivot apertures, the handle member can be pivoted about the pivot members between the storage position and a use position in which the handle gripping portion is located above the battery housing and lies in a substantially vertical plane. Means are provided for maintaining the pivot members in the pivot apertures while permitting the handle member to be pivoted between storage and use positions. The handle member lies in the plane of the cover, effectively becoming part of the cover when the handle member is in the storage position.

The self-latching battery handle provided by the invention is easier to attach to the battery container than are existing battery handles and requires less labor to attach the handle to the container because the battery handle is a one-piece unit that relies on cam action for insertion and guidance. To engage the handle with the container, the operator locates the ends of the handle in the receptacles and then merely lowers the handle to the storage position. By virtue of the cam action, the handle self engages with the cover of the battery container. Once engaged, the handle will not accidentally become disengaged from and separate from the battery, which could result in personal injury to the operator and/or end user. Moreover, the battery handle, according to the present invention eliminates the operator fatigue and possible injury.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 3 is a side elevation view of the self-latching battery handle provided by the present invention;

FIG. 4 is a top plan view of the self-latching battery handle provided by the present invention;

FIG. 5 is a section view taken along the line 5—5 of FIG. 3;

FIG. 6 is a section view taken along the line 6—6 of FIG. 3;

DETAILED DESCRIPTION OF THE PREFERRED EMBODIMENT

Figure 1:
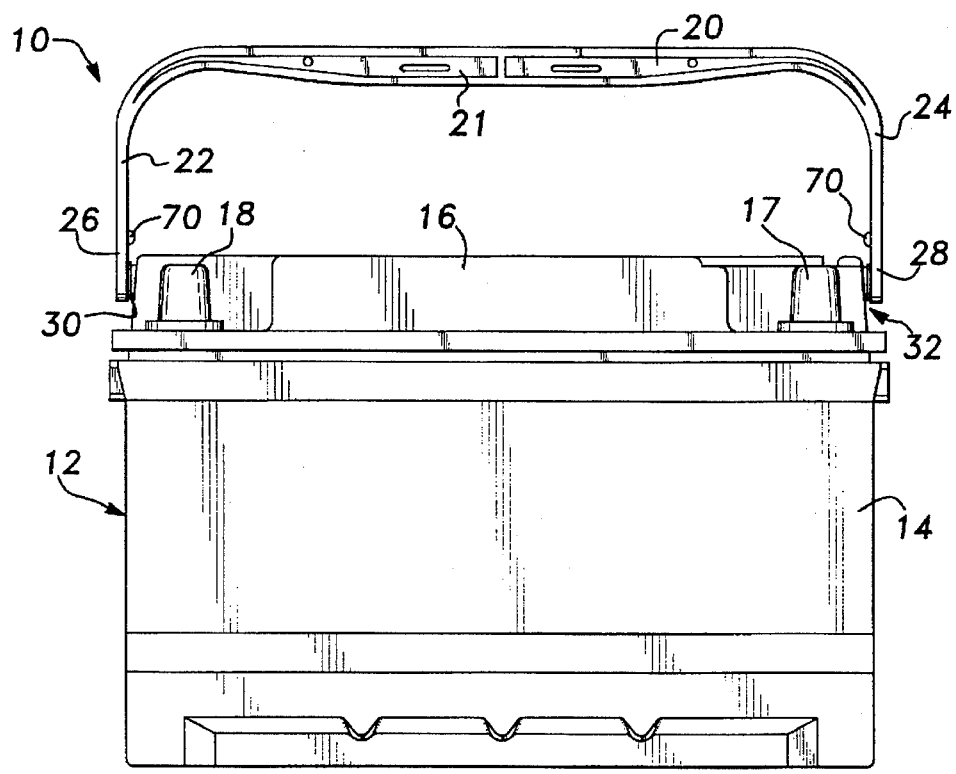
FIG. 1 is a side elevation view of a storage battery including the self-latching battery handle according to the present invention, with the handle shown in the use position.
Figure 2:
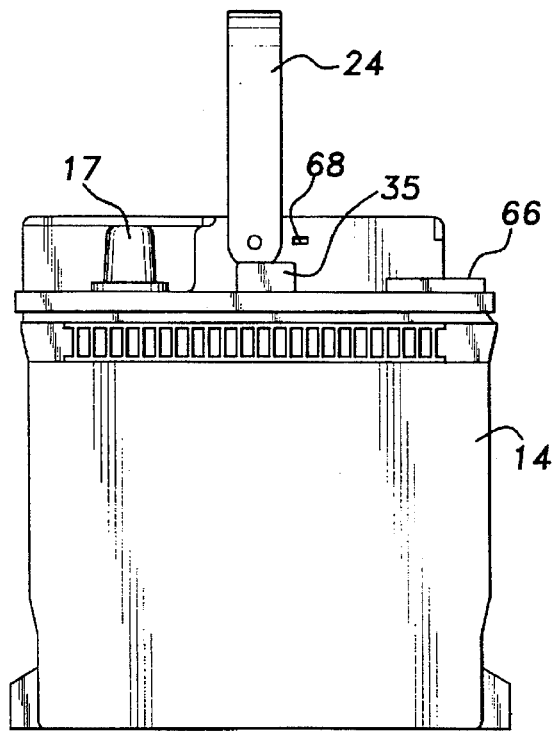
FIG. 2 is an end elevation view of the battery and the self-latching battery handle of FIG. 1.
Figure 7:
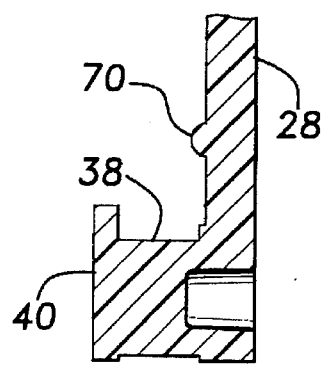
FIG. 7 is a section view taken along the line 7—7 of FIG. 4.
Figure 8:
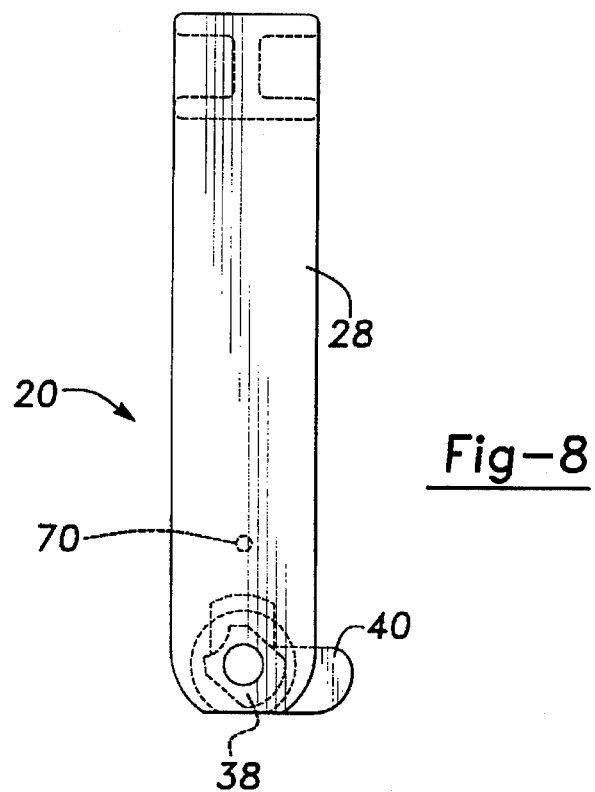
FIG. 8 is an end elevation view of the self-latching battery handle provided by the present invention.
Figure 9:
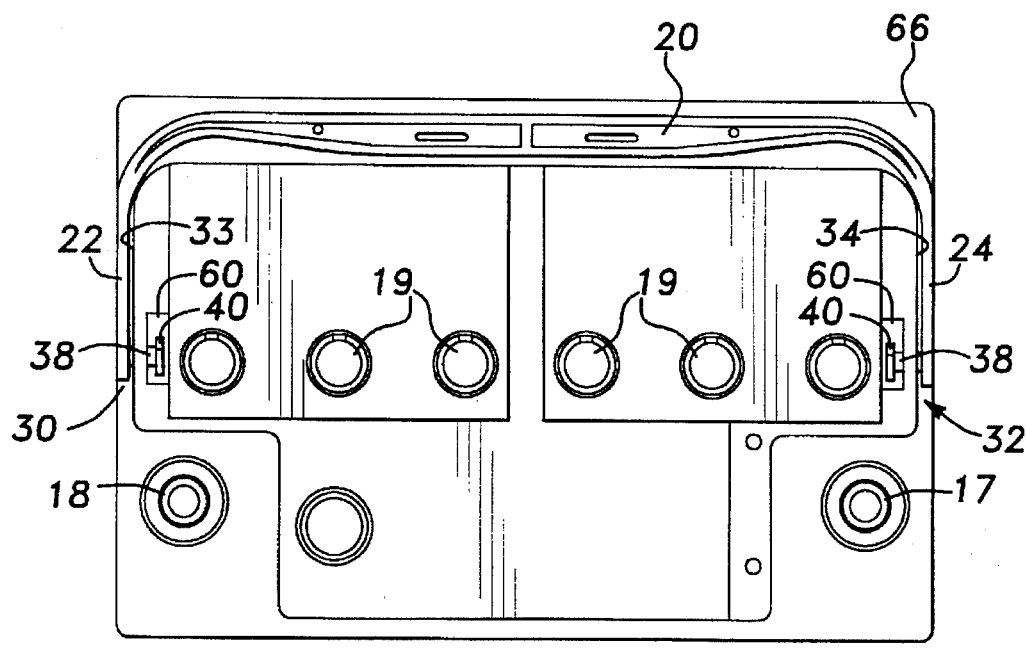
FIG. 9 is a top plan view partially broken awawy to reveal compartment 60 of the container of the battery of FIG. 1, and illustrating the battery handle in the storage position.

Referring to FIGS. 1, 2 and 9 of the drawings, the self-latching battery handle 10 provided by the present invention is shown mounted on a storage battery 12. The storage battery 12 includes a container 14 and a cover 16. The battery includes a positive terminal 17, a negative terminal 18 and vent caps 19 mounted on the cover as is conventional. The battery container and cover are formed of thin-walled plastic material such as polypropylene.

The battery handle is self-latching in that the installation of the handle is effected by positioning the ends of the handle in receptors on the battery container and then merely rotating the handle downwardly from an installation position to a storage position. As will be shown, with such rotation, cam portions of the self-latching handle cause pivot posts of the handle to become seated in and retained in pivot openings on the battery. The manner in which this operation is provided will become evident following a description of the self-latching battery handle provided by the invention.

Referring to FIGS. 1–4 and 10, the self-latching handle 10 includes a one—piece carrying handle 20 having a gripping portion 21 and two arms 22 and 24 that extend downwardly from the gripping portion. The underside of the gripping portion 21 is formed with a reinforcement section 23 having a plurality of apertures 23a therethrough. The battery handle 20 is adapted to span the length of the container and is secured at opposite ends 26 and 28 to mounting areas or receptors 30 and 32 which are formed at opposite sides of the battery cover in opposing vertical end surfaces 33 and 34 thereof. Each receptor includes an installation opening 35 and a pivot aperture portion 36 which together define a generally L-shaped access opening 37 for the receptor. The access openings 37 are formed through the vertical end surfaces 33 and 34 of the cover 16. The ends 26 and 28 of the battery handle 20 are configured to cooperate with the receptors to attach the battery handle 20 to the cover 16 and provide pivoting movement of the battery handle between a vertical use position illustrated in FIG. 1, for example, and a horizontal storage position illustrated in FIG. 9.

More specifically, with reference to FIGS. 5–8 and 12, the ends 26 and 28 of the battery handle 20 each include an integrally formed inwardly directed projection which includes a pivot post 38 and an index and cam element 40 that is formed integrally with the end of the pivot post 38. Each pivot post 38 is non-circular in shape and has first and second opposing, generally straight sides 41, 42, a third side 43 which has a convex arcuate shape, and a fourth side 44 which has a concave arcuate shape. The pivot post 38 has a pivot axis 39.

As shown in FIG. 6, the index and cam element 40 includes a cam defining portion 46 which is generally rectangular in appearance and has parallel top and bottom edges 47 and 48 and arcuate side edges 49 and 50. The cam defining portion 46 extends normal to the axis of the side of the battery handle. The bottom edge 48 and the side edge 49 define a cam surface 51 that is offset laterally relative to the pivot axis 39 of the pivot post. The index and cam element 40 further includes an indexing portion 52 which projects upwardly from the cam defining portion 46 near its side edge 50 and extends parallel to the axis of the battery handle.

The indexing portion 52 together with cam defining portion 46 of the index and cam element 40 provide an irregular shape that conforms generally to configuration of the L-shaped access aperture 37. This ensures that the battery handle 20 is oriented properly during installation of the battery handle on the battery cover so that the cam defining portions 46 of the cam elements 40 are aligned with respective bearing surfaces of the receptors 30 and 32, respectively.

Figure 10:
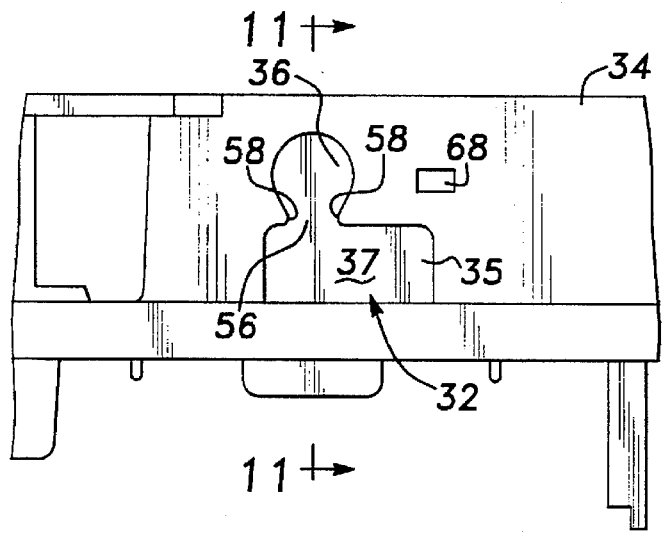
FIG. 10 is an enlarged, fragmentary side view of the cover of the battery of FIG. 1, illustrating the mounting receptor for the self-latching battery handle.
Figure 11:
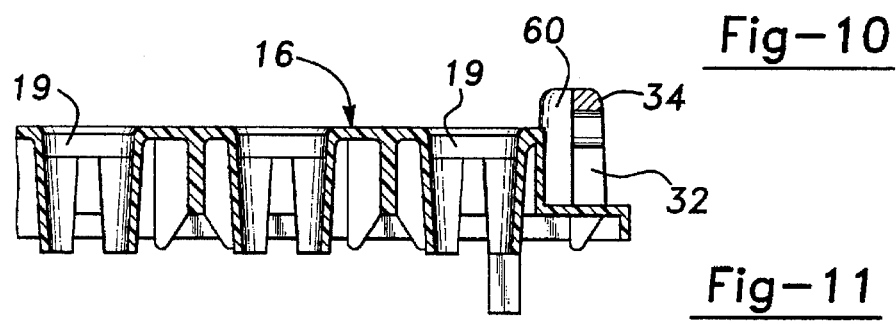
FIG. 11 is a section view taken along the line 11—11 of FIG. 10.
Figure 12:
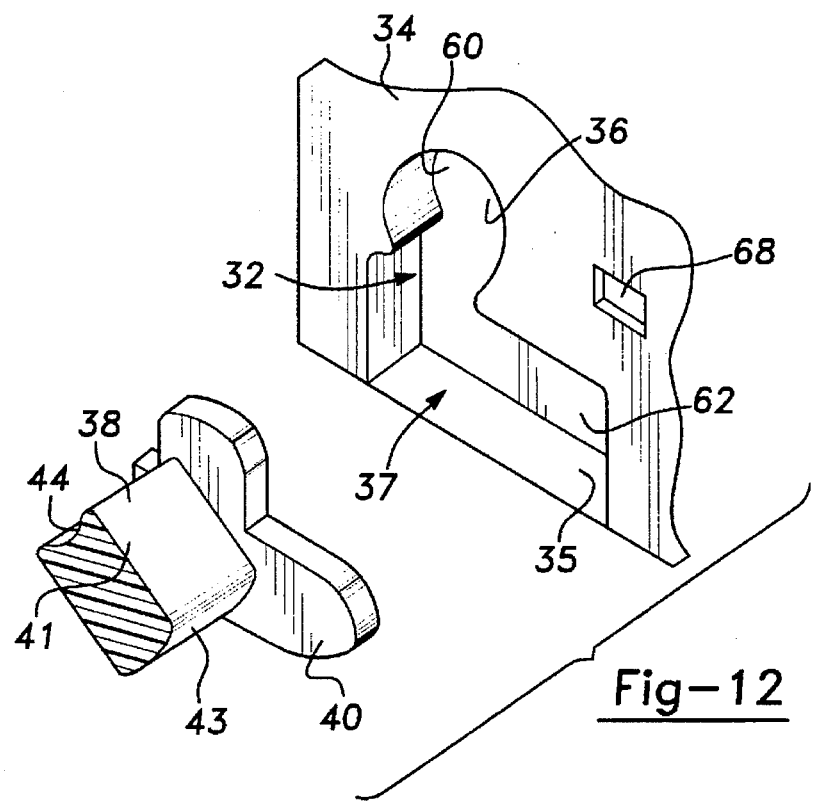
FIG. 12 is an enlarged, fragmentary perspective view illustrating the connecting portion of the battery handle and the reception portion of the cover of the battery housing.

Referring to FIGS. 10–12, the installation opening 35 of each receptor is generally rectangular in shape and opens upwardly near one end thereof into the pivot aperture 36, which is generally circular in shape. The installation opening 35 is communicated with the associated pivot aperture 36 by a restricted region 56 which includes opposing inwardly directed portions 58. The portions 58 that define a constriction between the installation opening 35 and the pivot aperture 36 function to prevent release of the pivot post 38 from the pivot aperture once the battery handle has been installed on the battery housing. To this end, the non-circular configuration of the pivot post 38 permits the pivot post to pass between the installation opening and the pivot aperture only when it is oriented with its concave side 44 aligned with one of the opposing inwardly directed portions 58 of the restricted region. Such orientation is provided only when the handle 20 is in the installation position, oriented vertically so that the index and cam element portion 40 is aligned with the access opening 37 as shown in FIG. 12 for receptacle 32.

The access aperture 37 for receptor 32 opens to a compartment 60 that is partially enclosed by the end surface 34 of the battery cover 16. The compartment 60 receives the index and cam element 40 with the pivot post 38, which is displaced outwardly relative to the cam defining portion 46, initially located in underlying relation with the pivot aperture 36. The bottom wall of the compartment defines a bearing surface 62. The cam surface 51 rides on bearing surface 62 when the battery handle is pivoted from the installation position to the storage position during the installation of the battery handle on the battery housing to move the pivot post 38 upwardly into the pivot aperture. The compartment 60 can include a stop surface that is engaged by a surface of the cam defining portion 46 to limit rotation of the battery handle to about 90°. Similarly, receptor 30 includes a compartment (not shown) for receiving the index and cam element 40 at the opposite end 26 of the battery handle.

Referring to FIGS. 2 and 9, the cover 16 has a shoulder 66 on its upper surface and extending along one side of the cover that is opposite to the side on which the battery terminals are located. The battery handle 20 rests on this shoulder 66 when the battery handle is in the storage position. The openings 23a in the handle can function as drain holes for any fluid that may collect on the handle while it is in its storage position. Each of the end surfaces 33 and 34 of the cover has a notch 68 formed therein receiving a projection 70 on arms 22 and 24 of the battery handle when the battery handle is in the storage position as shown in FIG. 9. The notches 68 and the projections 70 define a detent mechanism for maintaining the battery handle in the storage position. However, the battery handle can be moved from the storage position to the use position by applying a slight upward force to the battery handle, releasing the projections 70 from the notches 68, permitting pivoting of the battery handle about its pivot posts 38 to the vertical position.

To attach the battery handle 20 to the battery 12, the index and cam element 40 at one end of the battery handle, such as index and cam element 40 at end 28, is aligned with the access opening 37 of its respective receptor 32 and with the battery handle 20 oriented substantially vertically, so that the cam surface 51 is aligned with the receptor 32. The index and cam element 40 of end 28 is pressed into the access opening 37 of the receptor 32. The other end 26 of the battery handle is aligned with the access opening of receptor 30 in a similar fashion and is pressed into the access opening at the other side of the cover. The battery handle can be snapped onto the battery by aligning the index and cam elements on the battery handle with the receptors 30 and 32 in the cover simply by flexing the ends of the battery handle 20. With battery handle 20 in this position, its installation position, cam element 40 is received within compartment 60 with pivot element 38 received through access opening 37. Because of their configuration, the cam surfaces 51 of the index and cam elements 40 are aligned with the bearing surfaces 62 when the battery handle is oriented vertically, i.e, in its installation position.

Then, the battery handle 20 is rotated down from its vertical position to rest on the shoulder 66 on the upper portion of the cover 16. As the battery handle is rotated down, the cam portions 51 on both ends of the battery handle engage and turn on respective bearing surfaces 62 of the receptors, lifting the ends 26 and 28 of the battery handle upwardly, moving the pivot posts 38 into the pivot apertures 36. Because the cam surfaces 51 are offset laterally relative to the pivot axis 39 of the pivot posts 38, the lower ends of the battery handle are lifted relative to the bearing surfaces 62, moving the pivot posts 38 into the pivot apertures 36. The cam element 40 moves the pivot post 38 into the pivot aperture 36 during installation of the battery handle on the battery. Through such rotational movement, the cam action provides rotating and lifting of the non-circular pivot post 38 on the battery handle to pivot aperture 36 of cover 16. Such engagement is produced solely as the result of cam action as the battery handle 20 is rotated down to rest on the top of the cover. Once engaged, the pivot post 38 is locked in the cavity 60 against becoming disengaged because its non circular portion 41 and 42 engages the projections 58 defining the restrictions. Thus, once the ends of the battery handle have been moved to the locking position, the battery handle can be rotated up and down between storage and use positions, but the ends of the battery handle will not come out of the receptors 30 and 32 because they are secured in the upper portion of the cavity by the index and cam elements. Also, because of the irregular shape of the somewhat circular lobe portion that forms the pivot posts 38, the index and cam elements 40 which are located behind the forward wall of the access openings 37, trap the ends 26 and 28 of the battery handle in the respective receptors 30 and 32.

When the battery handle is rotated down onto the cover, it lies in the plane of the cover and effectively becoming part of the cover as shown in FIG. 9. The projections 70 fall into the notches 68, locking tile battery handle in place on the cover. The battery handle can not move off the cover by itself, but is readily moved upwardly, with the projections 70 being released from the notches 68 by manual operation of the user. When the battery handle is attached to the cover, the index and cam elements limit pivoting of the battery handle from the vertical use position, FIG. 2, to a direction away from the battery terminals, that is clockwise in FIG. 2, or back to the vertical use position. The handle cannot be pivoted from the vertical use position towards the battery terminals, i.e., counter-clockwise in FIG. 2 because the upper surface of the cam defining portions will engage in the top inner surfaces of the receptacles 30 and 32.

While the invention has been described in connection with certain preferred embodiments, it is not to be limited thereby but is to be limited solely by the scope of the claims which follow. For example, although the receptors are formed integrally with the cover, the receptors can be formed on the container sidewall. In such embodiment, the battery handle would be sufficiently long as to pass over the cover and be rotated down to a position in which the handle lies slightly below horizontal and engaging the side wall of the container to which it is pivoted. Also, the battery handle need not be foldable all the way down to lie on the cover. In addition, if the need should arise to remove the battery handle from the battery, the battery handle can be removed by rotating the battery handle down to its storage position and then working the index and cam elements out of the access openings, one side at a time.

What is claimed is:

1. A handle for a storage battery, said storage battery including a battery housing having first and second opposite sides, said handle comprising:

an elongated handle member having first and second arms and a gripping portion interconnecting said first and second arms, each of said arms defining an end portion including a pivot member, and cam means proximal to each end portion of said handle member;

and receptor means on said opposing sides of said battery housing for receiving said pivot members, each of said receptor means including an access aperture having a bearing surface, said access aperture including a pivot aperture portion and an installation opening providing access to said bearing surface;

said handle member installed on said battery housing in an installation position in which said handle member is oriented generally vertically with said cam means located in said access openings and aligned with said bearing surfaces and said pivot members located externally of said pivot apertures, and said handle member being movable from said installation position to a storage position in which said handle member lies in a substantially horizontal plane and said pivot members are located in said pivot apertures, said cam means being constructed and arranged to engage said bearing surfaces and pivot said handle member about said cam means as said handle member is moved from said installation position to said storage position, and thereby move said pivot members into said pivot apertures, and when said pivot members are located in said pivot apertures, said handle member being pivoting about said pivot members between said storage position and a use position in which said handle gripping portion is located above said battery housing and lies in a substantially vertical plane.

2. The handle according to claim 1, and including means for maintaining said pivot members in said pivot apertures after said handle member is moved from said installation position to said storage position.

3. The handle according to claim 1, wherein each said cam means includes a generally rectangular lower portion having first and second ends and a portion projecting outward from said lower portion near one end thereof, and wherein said pivot member is non-circular in shape.

4. The handle according to claim 3, wherein said access opening of each receptor means defines a generally rectangular slot, said pivot aperture extending upward from said slot near one end thereof, said slot and said pivot aperture defining said access aperture, said access aperture corresponding to the shape of said cam means, and said receptor means including a compartment located for receiving said cam means.

5. The handle according to claim 4, wherein each said pivot member has first and second opposing, generally straight sides, a third side which has a convex arcuate shape and a fourth side which has a concave arcuate shape.

6. The handle according to claim 1, wherein the pivot aperture for each receptor means is communicated with said installation opening for that receptor means, and said pivot members are located in said installation openings when said handle member is in said installation position.

7. The handle according to claim 6, including a constriction between the pivot aperture and the installation opening for each receptor means for preventing release of the pivot member from said pivot aperture.

8. The handle according to claim 1, wherein said battery housing includes a container and a cover and wherein said handle member is mounted on said battery cover.

9. The handle according to claim 8, wherein said cover defines a shoulder on the upper surface thereof and extending along one side thereof, said handle member resting on said shoulder when in said storage position.

10. A self-latching handle for a storage battery, said storage battery including a battery cover having first and second vertical surfaces at first and second opposite sides thereof said handle comprising:

an elongated handle member having first and second arms and a gripping portion interconnecting said first and second arms, said first and second arms extending parallel to one another and each of said arms defining an end portion including a pivot member, and a cam portion proximal to each end portion of said handle member;

and receptor means on said first and second sides of said battery cover for receiving said pivot members, each of said receptor means having a bearing surface; said receptor means including a pivot aperture and an installation opening;

indexing means for permitting said handle member to be mounted on said cover in an installation position in which said cam portions are aligned with said bearing surfaces, said handle member installed on said battery housing in an installation position in which said handle member is oriented generally vertically with said cam portions and said pivot members located in said access apertures with said cam portions aligned with said bearing surfaces, and said handle member pivoting from said installation position to a storage position in which said handle member lies in a substantially horizontal plane and said pivot members are located in said pivot apertures, said cam portions being configured to engage said bearing surfaces and pivot said handle member about said cam portions as said handle member is moved from said installation position to said storage position, and move said pivot members into said pivot apertures and when said pivot members are located in said pivot apertures, said handle member pivoting about said pivot members between said storage position and a use position in which said handle gripping portion is located above said battery cover and lies in a substantially vertical plane; and means for maintaining said pivot members in said pivot apertures.

11. The handle according to claim 10, wherein each said cam portion includes generally rectangular lower portion having first and second ends and a portion projecting outward from said lower portion near one end thereof, and wherein said pivot member is non-circular in shape.

12. The handle according to claim 11, wherein said access opening of each receptor means defines a generally rectangular slot defining said installation opening, said pivot aperture extending upward from said slot at one end thereof, said slot and said pivot aperture defining with an installation opening that corresponds to the shape of said cam portions, and said receptor means including a compartment located rearward of said installation opening for receiving said cam portions.

13. The handle according to claim 12, wherein said compartment defines a stop surface engaged by said cam portions to limit rotation of said handle member to 90°.

14. The handle according to claim 11, including a constriction between the pivot aperture and the installation opening for each receptor means for preventing release of the pivot member from said pivot aperture.

15. The handle according to claim 14, wherein each said pivot member has first and second opposing, generally straight sides, a third side which has a convex arcuate shape and a fourth side which has a concave arcuate shape to fit past said constriction means during rotation of said handle member from said installation position to said storage position.

16. The handle according to claim 15, wherein the pivot aperture for each receptor means is communicated with the installation opening for that receptor means, and said pivot members are located in said installation openings when said handle member is in said installation position.

17. The handle according to claim 10, wherein said cover defines a shoulder on the upper surface thereof and extending along one side thereof, said handle member resting on said shoulder when in said storage position.

18. The handle according to claim 10, and including detent means for maintaining said handle member in said storage position.

19. A self-latching handle for a storage battery, said storage battery including a battery cover having first and second vertical surfaces at first and second ends thereof, said handle comprising:

an elongated handle member having first and second arms and a gripping portion interconnecting said first and second arms, said first and second arms extending parallel to one another with each of said arms defining an end portion said end portions of said first and second arms including respective first and second pivot members for securing said handle member to said battery cover and for permitting pivoting of said handle member between a use position in which said handle gripping portion is located above said battery cover and lies in a substantially vertical plane and a storage position in which said handle member extends substantially horizontally and lies in the plane of said battery cover;

and first and second receptor means on said first and second surfaces of said cover, each of said receptor means including a compartment having a bearing surface, and each receptor means defining a handle member mounting area including an access aperture having an installation opening that opens to said compartment, and a pivot aperture communicated with said installation opening;

said first end portion including a first cam and said second end portion including a second cam, said first and second cams including respective first and second indexing means which attach said handle member to said cover in an installation position in which said first and second cams are aligned with said first and second bearing surfaces and said first and second pivot members are located in said first and second access openings respectively, said first and second cams being configured so that upon rotation of said handle member from said installation position to said storage position, said first and second cams cooperate with said first and second bearing surfaces, and lift said end portions of said first and second arms relative to said cover to move said first and second pivot members into said first and second pivot apertures, respectively, and at least one of said pivot apertures including constriction means which attach at least one of said pivot members from being released from said one pivot aperture after said handle member has been moved from said installation position to said storage position.

* * * * *